US012737487B2

(12) United States Patent
Ho et al.

(10) Patent No.: US 12,737,487 B2
(45) Date of Patent: Sep. 15, 2026

(54) METHOD FOR MANAGING ACCESS TO A FILE FOR NON-VOLATILE MEMORY

(71) Applicant: ATP ELECTRONICS TAIWAN INC., Taipei City (TW)

(72) Inventors: Chih-Wei Ho, Taipei City (TW); Jeng-Tsuen Shie, Taipei City (TW); Hung-Tse Lin, Taipei City (TW)

(73) Assignee: ATP ELECTRONICS TAIWAN INC., Taipei City (TW)

( * ) Notice: Subject to any disclaimer, the term of this patent is extended or adjusted under 35 U.S.C. 154(b) by 34 days.

(21) Appl. No.: 19/072,071

(22) Filed: Mar. 6, 2025

(65) Prior Publication Data

US 2025/0284830 A1 Sep. 11, 2025

(30) Foreign Application Priority Data

Mar. 7, 2024 (TW) ................................ 113108306

(51) Int. Cl.
*G06F 21/62* (2013.01)
*G06F 21/31* (2013.01)
*G06F 21/60* (2013.01)

(52) U.S. Cl.
CPC .......... *G06F 21/6209* (2013.01); *G06F 21/31* (2013.01); *G06F 21/604* (2013.01)

(58) Field of Classification Search
CPC .... G06F 16/1847; G06F 21/31; G06F 21/604; G06F 21/6209; G06F 3/0643; G06F 3/0679
See application file for complete search history.

(56) References Cited

U.S. PATENT DOCUMENTS 7,840,749 B2 * 11/2010 Maeda .................. G06F 3/0608 711/E12.083
7,861,311 B2 * 12/2010 Seo ......................... G06F 16/16 707/821
9,483,195 B2 * 11/2016 Liu ....................... G06F 12/023
(Continued)

FOREIGN PATENT DOCUMENTS

| CN | 114519033 A | 5/2022 |
|---|---|---|
| JP | 2003242030 A | 8/2003 |
| TW | 201514749 A | 4/2015 |

OTHER PUBLICATIONS

Search Report issued to European counterpart application No. 25161897.1 by the EPO on Jun. 5, 2025.
(Continued)

*Primary Examiner* — Gary S Gracia
(74) *Attorney, Agent, or Firm* — MUNCY, GEISSLER, OLDS & LOWE, P.C.

(57) ABSTRACT

A method for managing access to a file for non-volatile memory is implemented by a processing module of a computer system. The non-volatile memory includes multiple clusters. Upon receipt of a read instruction associated with a file, the processing module acquires cluster numbers corresponding to those clusters that store file data of the file from a file allocation table, and searches a file access permissions table to obtain corresponding data access permission codes, thereby determining whether these file data clusters are read access being permitted. If affirmative, the processing module reads the file data into volatile memory, and transmits the file data to an output module.

8 Claims, 7 Drawing Sheets

(56) References Cited

U.S. PATENT DOCUMENTS

2002/0083282 A1* 6/2002 Yoshino .................. G06F 21/79 711/163
2002/0156738 A1* 10/2002 Irmler ..................... G06F 21/10 705/52
2002/0199099 A1* 12/2002 Shirai ................ G11B 20/0021 713/160
2003/0212752 A1* 11/2003 Thunquest .............. G06F 16/10 709/213
2006/0008257 A1* 1/2006 Mahashin ............ G11B 27/329 386/E5.042
2006/0107009 A1* 5/2006 Ooshima ............... G06F 3/0679 711/163
2006/0129749 A1* 6/2006 Nakanishi ............. G06F 3/0613 711/103
2007/0266037 A1* 11/2007 Terry ................... G11B 27/329
2008/0222207 A1* 9/2008 Ito ........................ G11B 27/034
2009/0327371 A1* 12/2009 Yamagata ........... G06F 12/0238
2010/0217787 A1* 8/2010 Ochi ..................... G06F 3/0613 707/823
2013/0179626 A1* 7/2013 Chang ................... G06F 3/0619 711/E12.008
2014/0068182 A1* 3/2014 Terry .................... G06F 3/0689 711/114
2015/0278246 A1* 10/2015 Toyama ................ G06F 3/0643 707/622
2015/0281361 A1* 10/2015 Maeda .................... H04L 67/12 709/219
2019/0065526 A1* 2/2019 Ribeiro ................. G06F 16/176
2025/0284830 A1* 9/2025 Ho ........................ G06F 3/0643
2025/0390232 A1* 12/2025 Huang .................... G06F 3/062

OTHER PUBLICATIONS

Search Report appended to an Office Action, which was issued to Taiwanese counterpart application No. 113108306 by the TIPO on Oct. 8, 2025, with an English translation thereof.

* cited by examiner

METHOD FOR MANAGING ACCESS TO A FILE FOR NON-VOLATILE MEMORY

CROSS-REFERENCE TO RELATED APPLICATION

This application claims priority to Taiwanese Invention patent application No. 113108306, filed on Mar. 7, 2024, the entire disclosure of which is incorporated by reference herein.

FIELD

The disclosure relates to a method for managing access to a file, and more particularly to a method for managing access to a file for non-volatile memory.

BACKGROUND

Conventionally, file management applications offered by file allocation table (FAT) systems (e.g., FAT32) are limited, and only support basic functions like read-only attribute, hidden attribute, etc. As a result, businesses often need to set up additional file databases or install extra file management software to achieve more efficient and streamlined file management, which leads to unnecessary costs.

SUMMARY

Therefore, an object of the disclosure is to provide a FAT-based file management mechanism that enables businesses to carry out various file management applications more efficiently and conveniently.

According to the disclosure, a method is provided for managing access to a file for non-volatile memory, and is implemented using a computer system that includes a processing module, an output module electrically connected to the processing module, and a storage module electrically connected to the processing module. The storage module includes a volatile memory unit and a non-volatile memory unit, and the non-volatile memory unit stores a file allocation table, files, and a first access permissions table. Each of the files has a directory entry that is unique, and file data. The file allocation table organizes the non-volatile memory unit into clusters, and each of the clusters corresponds to a respective one of cluster numbers. The clusters include a root directory cluster and file data clusters. The root directory cluster stores, for each of the files, the directory entry and a starting cluster number, which is one of the cluster numbers. The file data clusters store the file data of the files. The first access permissions table includes the cluster numbers, and, for each of the cluster numbers, a data access permission code that corresponds to the cluster number. The method includes steps of: (A) by the processing module, upon receipt of a read instruction associated with a target file that is one of the files stored in the non-volatile memory unit, acquiring the starting cluster number that corresponds to the target file based on the directory entry of the target file and the file allocation table, and making the starting cluster number thus acquired serve as a target cluster number; (B) by the processing module, retrieving the data access permission code that corresponds to the target cluster number from the first access permissions table, and making the data access permission code thus retrieved serve as a target data access permission code; (C) by the processing module, determining whether the target data access permission code indicates read access being permitted; (D) by the processing module, in response to the target data access permission code indicating read access being permitted, reading the file data stored in one of the file data clusters that corresponds to the target cluster number into the volatile memory unit, and determining whether the target file has been completely read based on the file data thus read; (E) by the processing module, in response to determining that the target file has not been completely read, updating the target cluster number to be one of the cluster numbers that is included in the file data being read in step (D) and that indicates a next one of the file data clusters storing the file data of the target file, and repeating step (B) using the target cluster number thus updated; and (F) by the processing module, in response to determining that the target file has been completely read, transmitting the file data of the target file that has been stored in the volatile memory unit to the output module.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
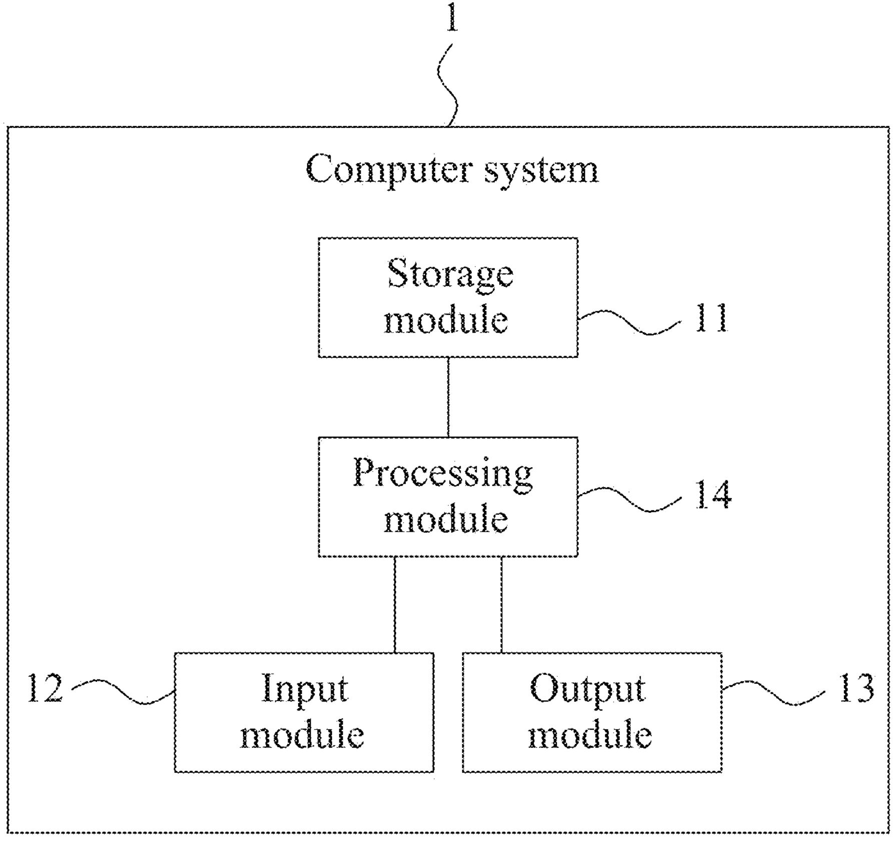
FIG. 1 is a block diagram illustrating an exemplary computer system that implements a method for managing access to a file for non-volatile memory according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a computer system 1 is provided to implement a method for managing access to a file for non-volatile memory according to an embodiment of this disclosure. The computer system 1 includes a storage module 11, an input module 12, an output module 13, and a processing module 14 electrically connected to the storage module 11, the input module 12 and the output module 13. The computer system 1 may be, for example, a desktop computer, a tablet computer, a laptop computer, a smart device (e.g., a smartphone), a server, etc., and this disclosure is not limited in this respect. In one embodiment, the input module 12 may include, for example, a keyboard, a mouse, a touch screen, other suitable input means, or any combination thereof. In one embodiment, the output module 13 may include, for example, a display, other suitable output means, or any combination thereof. The processing module 14 may include, but is not limited to, for example, one or more of a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), a system on a chip (SoC), etc.

Figure 2:
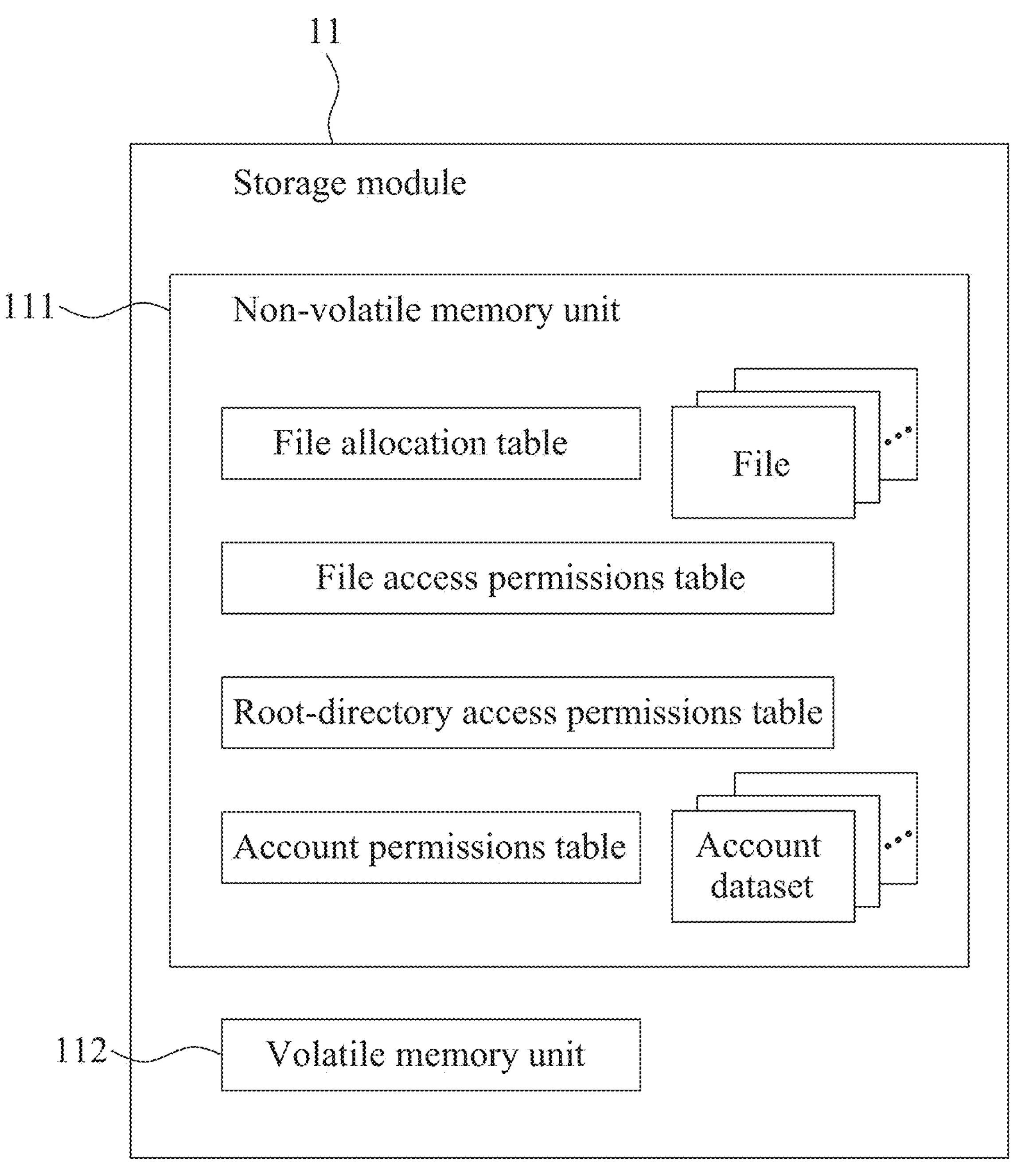
FIG. 2 is a block diagram illustrating a non-volatile memory unit according to the embodiment.

Referring further to FIG. 2, the storage module 11 includes a non-volatile memory unit 111 and a volatile memory unit 112. In one embodiment, the non-volatile memory unit 111 may include, for example, a hard disk drive (HDD), a solid state drive (SSD), a flash drive, other types of non-transitory storage devices, or any combination thereof. In one embodiment, the volatile memory unit 112 may include, for example, random access memory, other types of transitory storage devices, or any combination thereof.

The non-volatile memory unit 111 stores a file allocation table, a plurality of files, a file access permissions table, and a root-directory access permissions table. Each of the files has a unique directory entry and file data.

The file allocation table organizes the non-volatile memory unit 111 into a plurality of clusters that correspond to a plurality of cluster numbers, respectively. The clusters include a root directory cluster and a plurality of file data clusters. The root directory cluster stores, for each of the files, the directory entry and a starting cluster number, which is one of the cluster numbers. The file data clusters store the file data of the files. The file access permissions table includes the cluster numbers, and, for each of the cluster numbers, a data access permission code that corresponds to the cluster number. Each data access permission code indicates a type of data access permission.

In one embodiment, the data access permission code is implemented using four bits, which allows representations of sixteen types of data access permission. In one embodiment, the sixteen types of data access permission include, for example, read and write permission (i.e., both read access and write access are permitted), read permission and write denial (i.e., read access is permitted and write access is denied/not permitted), read denial (i.e., read access is denied/not permitted), read permission and single-write permission (i.e., read access is permitted and write access is only permitted once), read and write permission for a particular (or designated) group (i.e., both read access and write access are permitted for an account or accounts in a particular/designated group), read permission and write denial for a particular (or designated) group (i.e., read access is permitted and write access is denied/not permitted for an account or accounts in a particular/designated group), etc., and this disclosure is not limited in this respect. In one embodiment, the file allocation table employs the FAT32 format, but this disclosure is not limited to such.

The root-directory access permissions table includes storage locations of the directory entries of the files in the root directory cluster, and, for each of the storage locations, a directory access permission code corresponding to the storage location.

The root directory cluster includes a plurality of sectors, and each sector is divided into a plurality of sub-sectors. Each of the directory entries is stored in one of the sub-sectors of the sectors, and each of the storage locations in the root-directory access permissions table indicates one of the sectors where the corresponding one of the directory entries is stored, and one of the sub-sectors where the corresponding one of the directory entries is stored, in said one of the sectors. In the FAT32 system architecture, the root directory cluster contains 64 sectors totaling 32,768 bytes, with each sector being divided into 16 sub-sectors of 512 bytes. Each sub-sector is 32 bytes and is used to store a single directory entry. In one embodiment, the root-directory access permissions table employs 8 bits to identify a sector position among the 64 sectors, and employs 4 bits to distinguish a sub-sector position among the 16 sub-sectors.

The non-volatile memory unit 111 further stores a plurality of account datasets and an account permissions table. Each of the account datasets includes a user account and a password corresponding to the user account. The account permissions table includes the user accounts of the account datasets, and, for each user account, one of multiple account groups that corresponds to the user account.

In one embodiment, the method for managing access to a file for non-volatile memory includes a file-reading procedure, a file-writing procedure, a file-reading procedure for a particular group, and/or a directory-writing procedure.

Figure 3:
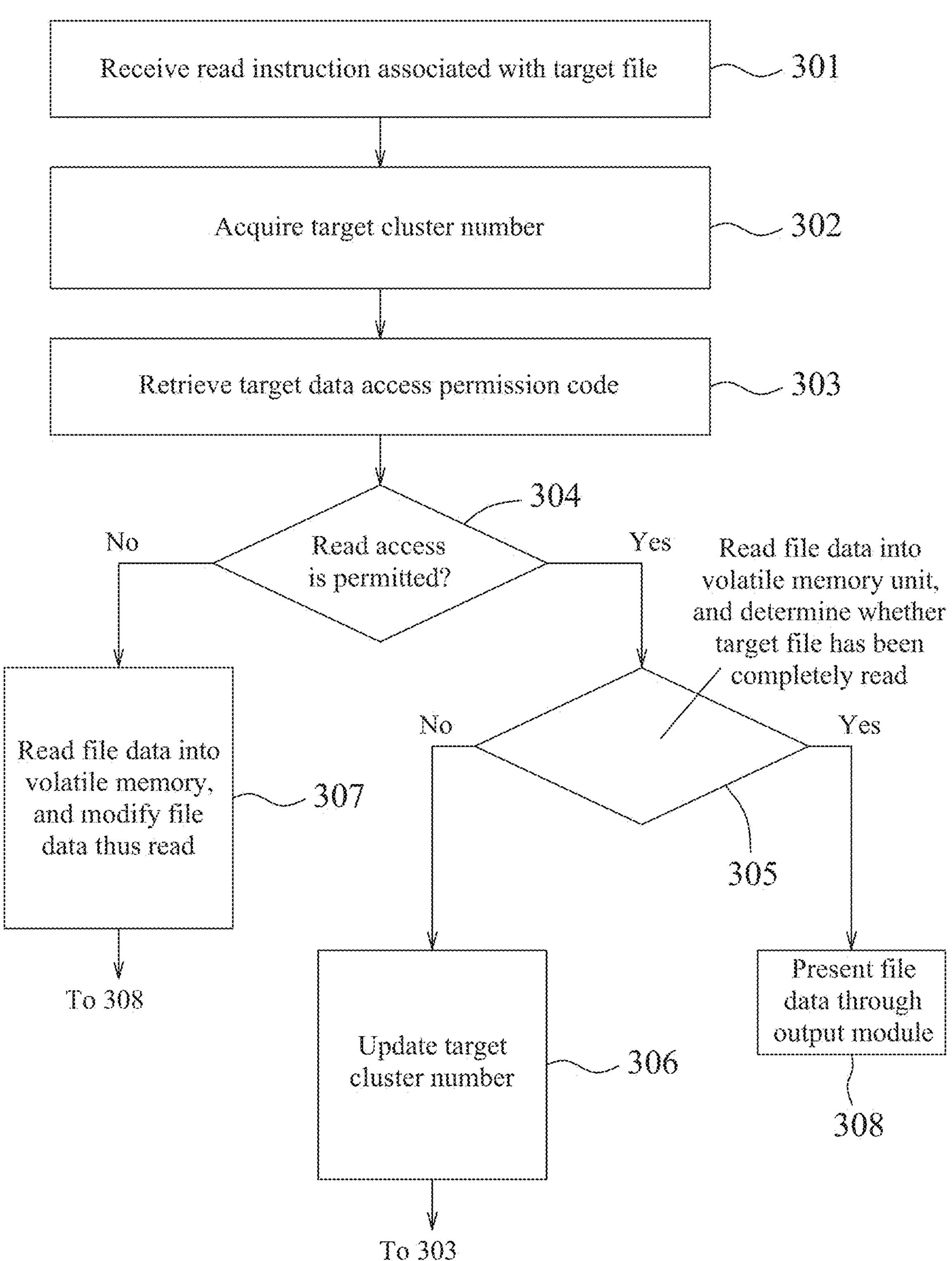
FIG. 3 is a flow chart illustrating steps of a file-reading procedure according to the embodiment.

Referring to FIGS. 1 to 3, the file-reading procedure includes steps 301 to 308.

In step 301, the processing module 14 receives a first read instruction that is generated by, for example, an operating system or a program installed in the computer system 1 in response to a user operation for reading a target file, which is one of the files stored in the non-volatile memory unit 111. The user operation is provided by a user operating the input module 12, and the first read instruction is associated with the file data of the target file. In one embodiment, the first read instruction includes the directory entry of the target file. Then, the flow goes to step 302.

In step 302, the processing module 14 acquires the starting cluster number that corresponds to the target file based on the directory entry of the target file and the file allocation table, and makes the starting cluster number thus acquired serve as a target cluster number. In one example, the directory entry in the FAT32 system includes at least a filename and a filename extension, and the processing module 14 uses the combination of the filename and the filename extension, which is unique within a single directory, to look up the file allocation table, thereby obtaining the starting cluster number that corresponds to the target file.

In step 303, the processing module 14 retrieves the data access permission code that corresponds to the target cluster number from the file access permissions table, and makes the data access permission code thus retrieved serve as a target data access permission code.

In step 304, the processing module 14 determines whether the target data access permission code indicates read access being permitted. The flow goes to step 305 when the determination is affirmative, and goes to step 307 when otherwise (e.g., read access is denied or not permitted).

In step 305, the processing module 14 reads the file data stored in one of the file data clusters that corresponds to the target cluster number into the volatile memory unit 112, and determines whether the target file has been completely read based on the file data thus read. The flow goes to step 306 when the determination is negative, and goes to step 308 when the determination is affirmative.

In step 306, the processing module 14 updates the target cluster number to be one of the cluster numbers that is included in the file data being read in step 305 and that indicates a next one of the file data clusters storing the file data of the target file. Then, the flow goes back to step 303 with the target cluster number thus updated. It is noted that in a case where the target file is stored across multiple clusters, each file data segment in a file data cluster includes a cluster number that indicates the next file data cluster holding the following segment of the file data, except for the last file data segment.

In step 307, the processing module 14 reads the file data stored in one of the file data clusters that corresponds to the target cluster number into the volatile memory unit 112, and modifies the file data thus read into the volatile memory unit 112 according to a predetermined rule. In one embodiment, the predetermined rule is to modify all bits of the file data thus read into the volatile memory unit 112 to "0" or "1," thereby preventing true file data from being presented in the subsequent step 308, but the predetermined rule is not limited to such. In some embodiments, the computer system 1 may crash when no file data is returned in response to a read instruction. This approach can effectively prevent such crashes from occurring.

In step 308, the processing module 14 transmits the file data that is related to the target file and that has been stored in the volatile memory unit 112 to the output module 13, thereby presenting or displaying the complete file data of the target file or the modified file data through the output module 13.

Figure 4:
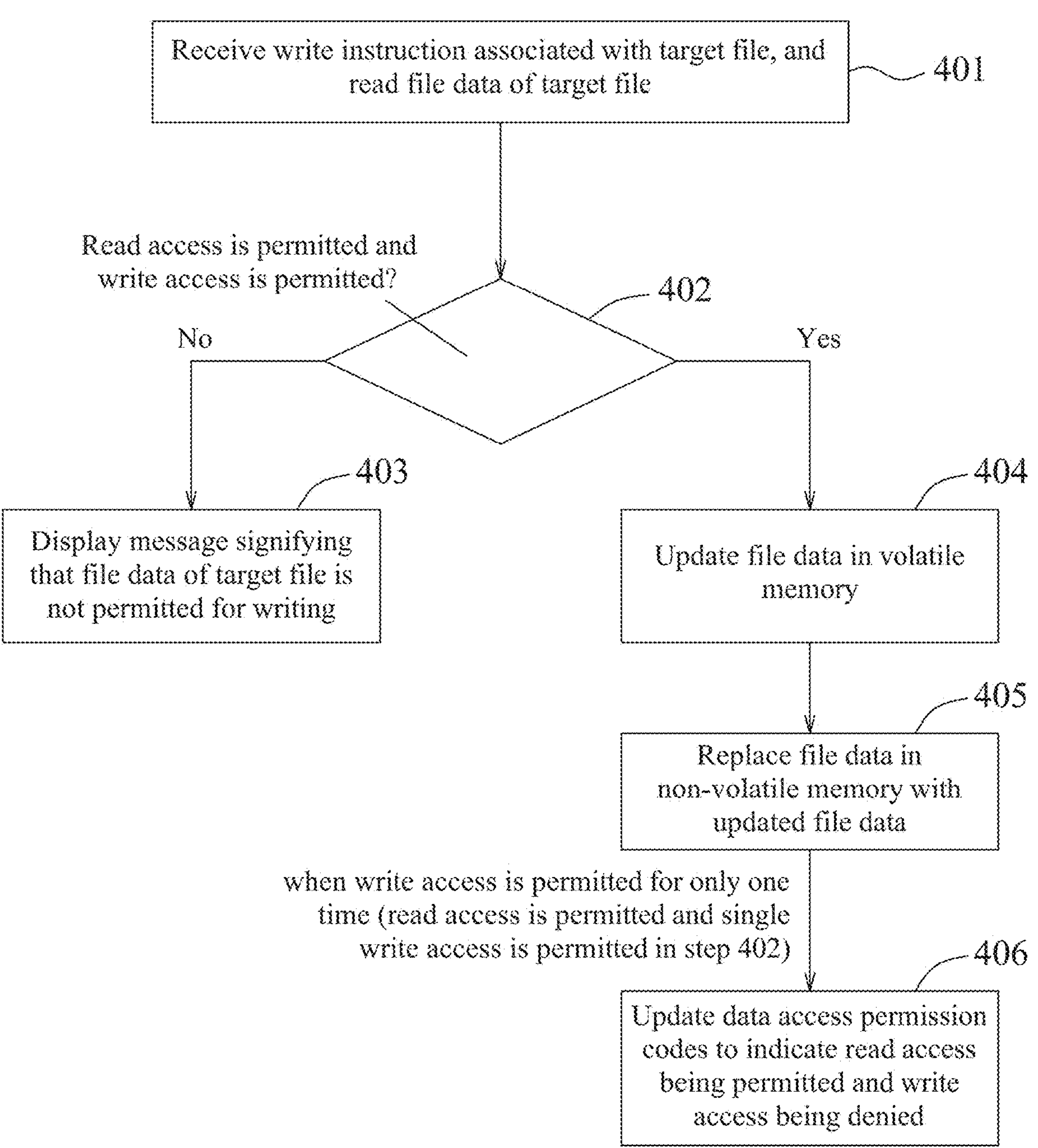
FIG. 4 is a flow chart illustrating steps of a file-writing procedure according to the embodiment.
Figure 5A:
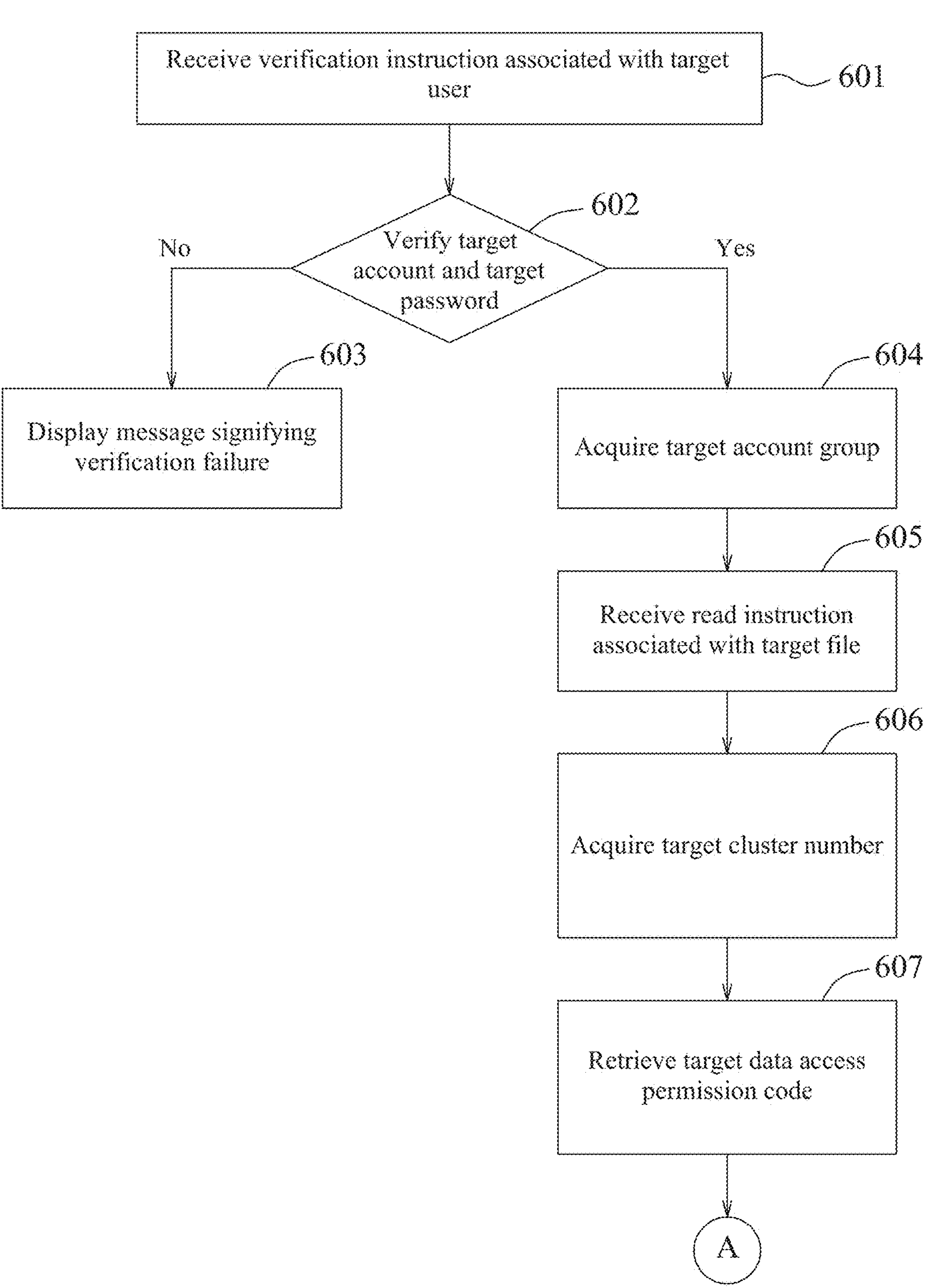
FIGS. 5A and 5B cooperatively provide a flow chart illustrating steps of a file-reading procedure for a particular group according to the embodiment.
Figure 5B:
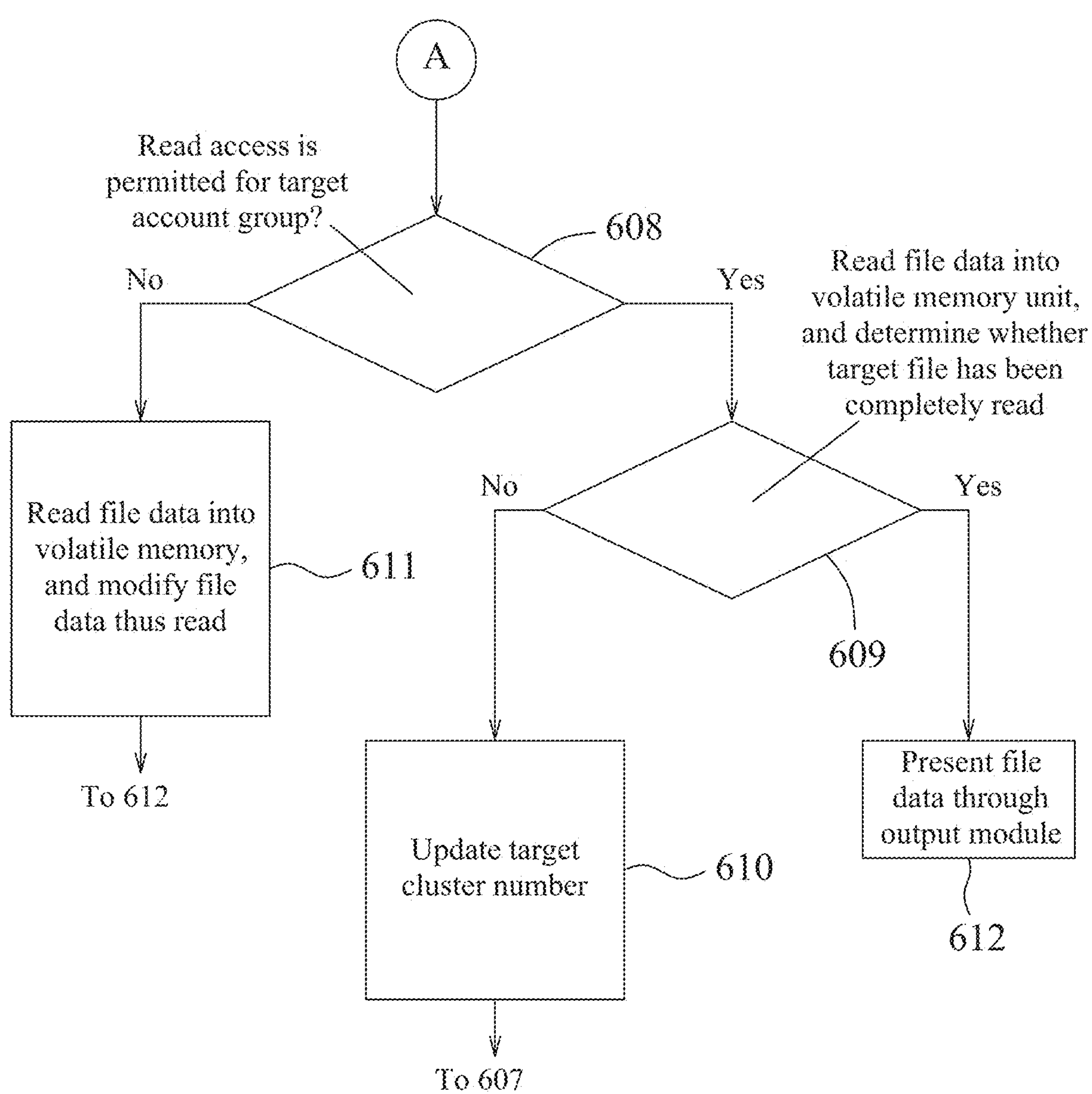

Referring to FIGS. 1, 2 and 4, the file-writing procedure includes steps 401 to 406.

In step 401, the processing module 14 receives a write instruction that is generated by, for example, an operating system or a program installed in the computer system 1 in response to a user operation for writing the target file, where the write instruction is associated with the file data of the target file. In one embodiment, the write instruction includes the directory entry of the target file. Upon receipt of the write instruction, the processing module 14 performs steps 302 to 308 (see FIG. 2) to read the file data of the target file into the volatile memory unit 112, and to present the file data of the target file through the output module 13. Then, the processing module 14 performs step 402.

In step 402, the processing module 14 determines, based on the file access permissions table and N number of the cluster numbers that respectively correspond to N number of the file data clusters storing the file data of the target file, whether all of the data access permission codes that correspond to the N number of the cluster numbers indicate read access being permitted and write access of the same type being permitted, where N is a positive integer. In some embodiments, the write access to be determined in this step may include both of permanent write access (for repeated writing) and single write access (for writing only once). In other words, in this step, the processing module 14 determines whether all of the data access permission codes indicate read access being permitted and permanent write access being permitted, and whether all of the data access permission codes indicate read access being permitted and single write access being permitted. The flow goes to step 403 when neither of the above two determinations is affirmative, and goes to step 404 when one of the above two determinations is affirmative.

In step 403, the processing module 14 generates a first message signifying that the file data of the target file is not permitted for writing, and transmits the first message to the output module 13, thereby presenting or displaying the first message through the output module 13.

In step 404, the processing module 14 updates the file data of the target file in the volatile memory unit 112 based on a user input from the input module 12, and transmits the file data thus updated to the output module 13, thereby presenting or displaying the updated file data through the output module 13.

In step 405, in response to completion of updating the file data of the target file in the volatile memory unit 112, the processing module 14 replaces the file data of the target file stored in the N number of the file data clusters with the updated file data of the target file in the volatile memory unit 112. When the processing module 14 determines in step 402 that all of the data access permission codes indicate read access being permitted and single write access being permitted, the flow further goes to step 406.

In step 406, the processing module 14 updates the data access permission codes that are in the file access permissions table and that correspond to the N number of the cluster numbers to indicate read access being permitted and write access being denied.

In some embodiments, when the processing module 14 determines in step 402 that all of the data access permission codes indicate read access being permitted and permanent write access being permitted, the processing module 14 may update the data access permission codes that are in the file access permissions table and that correspond to the N number of the cluster numbers to indicate read access being permitted and write access already granted, which is still a state of permanent write access being permitted.

Referring to FIGS. 1, 2, 5A and 5B, the file-reading procedure for a particular group includes steps 601 to 612.

In step 601, the processing module 14 receives a verification instruction that is generated by, for example, an operating system or a program installed in the computer system 1 in response to a user operation for verifying a user account, where the verification instruction is associated with a target user and contains a target account and a target password. Then, the flow goes to step 602.

In step 602, the processing module 14 verifies the target account and the target password based on the account datasets. In one embodiment, the processing module 14 determines whether the target account and the target password are the user account and the password in one of the account datasets. The flow goes to step 603 when the verification fails, and goes to step 604 when the verification succeeds (e.g., the target account and the target password are the user account and the password in one of the account datasets).

In step 603, the processing module 14 generates a second message signifying the failure of verification, and transmits the second message to the output module 13, thereby presenting or displaying the second message through the output module 13.

In step 604, the processing module 14 acquires, based on the account permissions table, a target account group that is one of multiple account groups and that corresponds to the target account. The account groups may be defined by a system administrator, and read permission for different account groups may be indicated using different data access permission codes.

In step 605, the processing module 14 receives a second read instruction that is generated by, for example, an operating system or a program installed in the computer system 1 in response to a user operation for reading the target file, where the user operation is provided by a user operating the input module 12, and the second read instruction is associated with the file data of the target file. In one embodiment, the second read instruction includes the directory entry of the target file. Then, the flow goes to step 606.

In step 606, the processing module 14 acquires the starting cluster number that corresponds to the target file based on the directory entry of the target file and the file allocation table, and makes the starting cluster number thus acquired serve as a target cluster number.

In step 607, the processing module 14 retrieves the data access permission code that corresponds to the target cluster number from the file access permissions table, and makes the data access permission code thus retrieved serve as a target data access permission code.

In step 608, the processing module 14 determines whether the target data access permission code indicates read access being permitted for the target account group. The flow goes to step 609 when the determination is affirmative, and goes to step 611 when otherwise.

In step 609, the processing module 14 reads the file data stored in one of the file data clusters that corresponds to the target cluster number into the volatile memory unit 112, and determines whether the target file has been completely read based on the file data thus read. The flow goes to step 610 when the determination is negative, and goes to step 612 when the determination is affirmative.

In step 610, the processing module 14 updates the target cluster number to be one of the cluster numbers that is included in the file data being read in step 609 and that indicates a next one of the file data clusters storing the file data of the target file. Then, the flow goes back to step 607 with the target cluster number thus updated.

In step 611, the processing module 14 reads the file data stored in one of the file data clusters that corresponds to the target cluster number into the volatile memory unit 112, and modifies the file data thus read into the volatile memory unit 112 according to the predetermined rule.

In step 612, the processing module 14 transmits the file data that is related to the target file and that has been stored in the volatile memory unit 112 to the output module 13, thereby presenting or displaying the complete file data of the target file or the modified file data through the output module 13.

It is noted that one having ordinary skill in the art may derive a file-writing procedure for a particular group by properly combining the aforesaid file-writing and file-reading procedures for a particular group and determining whether the target data access permission code indicates read access being permitted and write access being permitted for the target account group. Similarly, a one-time file-writing procedure for a particular group may be derived by properly combining the aforesaid one-time file-writing and file-reading procedures for a particular group and determining whether the target data access permission code indicates read access being permitted and single write access being permitted for the target account group. Accordingly, details of the file-writing procedure for a particular group and the one-time file-writing procedure for a particular group are not described herein for the sake of brevity.

Figure 6:
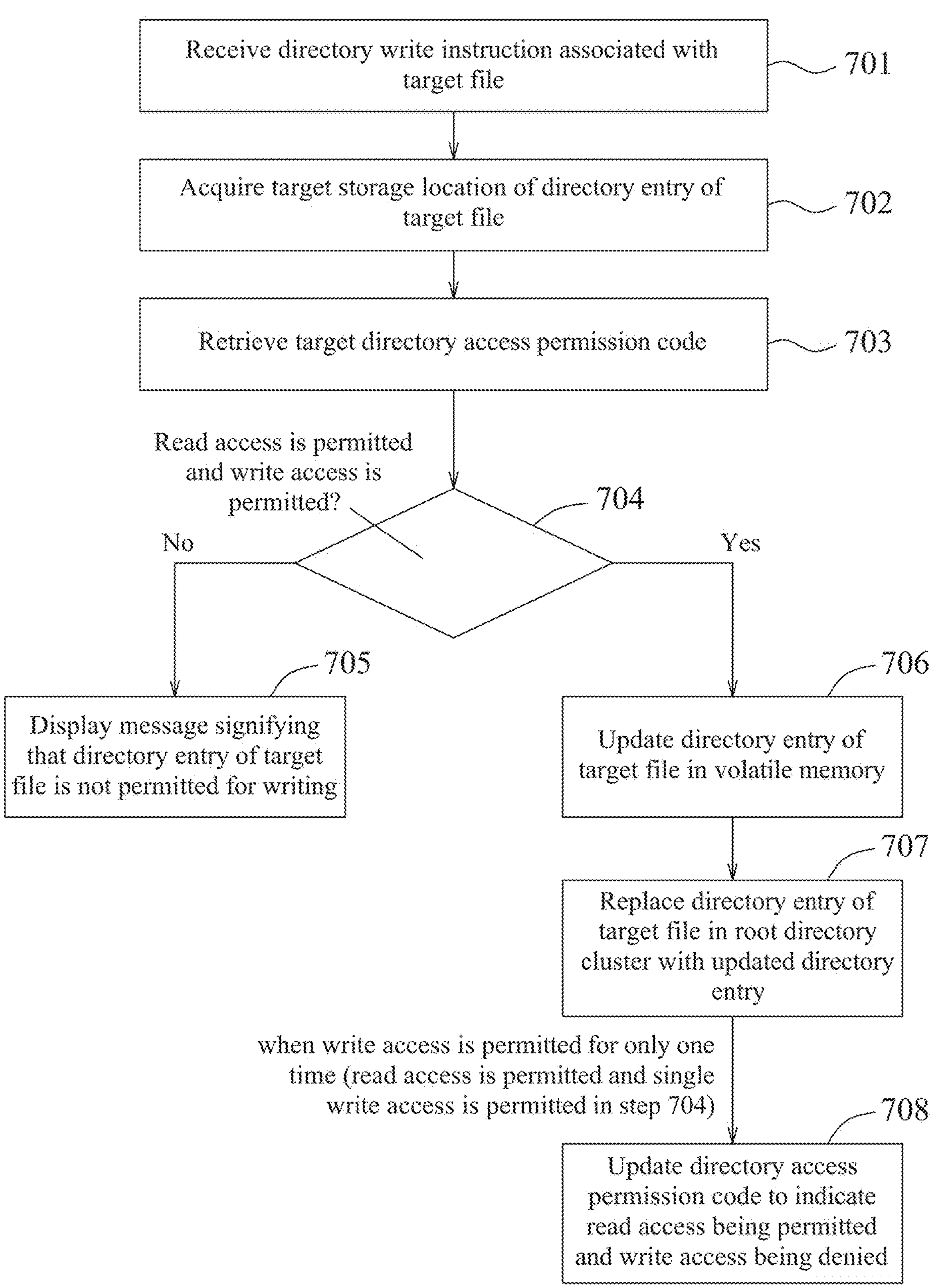
FIG. 6 is a flow chart illustrating steps of a directory-writing procedure according to the embodiment.

Referring to FIGS. 1, 2 and 6, the directory-writing procedure includes steps 701 to 707.

In step 701, the processing module 14 receives a directory write instruction that is generated by, for example, an operating system or a program installed in the computer system 1 in response to a user operation for writing a directory entry of the target file, where the directory write instruction is associated with the directory entry of the target file. In one embodiment, the directory write instruction includes the directory entry of the target file, and the processing module 14 stores the directory entry of the target file into the volatile memory unit 112 upon receipt of the directory write instruction. Then, the flow goes to step 702.

In step 702, the processing module 14 acquires a target storage location from the root-directory access permissions table based on the directory entry of the target file, where the target storage location is the storage location of the directory entry of the target file in the root directory cluster. The target storage location indicates a target sector that is one of the sectors where the directory entry of the target file is stored in the root directory cluster, and a target sub-sector that is one of the sub-sectors, where the directory entry of the target file is stored, in the target sector.

In step 703, the processing module 14 retrieves the directory access permission code that corresponds to the target storage location from the root-directory access permissions table, and makes the directory access permission code thus retrieved serve as a target directory access permission code. In one embodiment, the processing module 14 searches the root-directory access permissions table based on information of the target sector and the target sub-sector as indicated by the target storage location, thereby retrieving the directory access permission code that corresponds to the target storage location.

In step 704, the processing module 14 determines whether the target directory access permission code indicates read access being permitted and write access being permitted. In some embodiments, the write access to be determined in this step may include both of permanent write access (for repeated writing) and single write access (for writing only once). In other words, in this step, the processing module 14 determines whether the target directory access permission code indicates read access being permitted and permanent write access being permitted, and whether the target directory access permission code indicates read access being permitted and single write access being permitted. The flow goes to step 705 when neither of the above two determinations is affirmative, and goes to step 706 when one of the above two determinations is affirmative.

In step 705, the processing module 14 generates a third message signifying that the directory entry of the target file is not permitted for writing, and transmits the third message to the output module 13, thereby presenting or displaying the third message through the output module 13.

In step 706, the processing module 14 updates the directory entry of the target file in the volatile memory unit 112 based on a user input from the input module 12, and transmits the directory entry thus updated to the output module 13, thereby presenting or displaying the updated directory entry of the target file through the output module 13.

In step 707, in response to completion of updating the directory entry of the target file in the volatile memory unit 112, the processing module 14 replaces the directory entry of the target file stored in the root directory cluster with the directory entry of the target file thus updated in the volatile memory unit 112. When the processing module 14 determines in step 704 that the target directory access permission code indicates read access being permitted and single write access being permitted, the flow further goes to step 708.

In step 708, the processing module 14 updates the directory access permission code that is in the root-directory access permissions table and that corresponds to the target storage location to indicate read access being permitted and write access being denied.

In some embodiments, when the processing module 14 determines in step 704 that the target directory access permission code indicates read access being permitted and permanent write access being permitted, the processing module 14 may update the directory access permission code that is in the root-directory access permissions table and that corresponds to the target storage location to indicate read access being permitted and write access already granted, which is still a state of permanent write access being permitted.

In summary, when the user issues a read instruction or a write instruction for the file data of the target file, the processing module 14 of the computer system 1 that implements the embodiment of the aforesaid method acquires the cluster numbers corresponding to the file data clusters that store the file data of the target file from the file allocation table (e.g., FAT32), and searches the file access permissions table to obtain the corresponding data access permission codes, thereby determining whether these file data clusters are readable and/or writable. Furthermore, when the user issues a read instruction or a write instruction for the directory entry of the target file, the processing module 14 of the computer system 1 that implements the embodiment of the aforesaid method searches the root-directory access permissions table to acquire the target storage location of the directory entry of the target file in the root directory cluster, thereby determining whether the directory entry of the target file is writable based on the root-directory access permissions table and the target storage location. As a result, various file management applications can be implemented through the FAT-based file access permissions table and the root-directory access permissions table.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for managing access to a file for non-volatile memory, comprising:

providing a computer system that includes a processing module, an output module electrically connected to the processing module, and a storage module electrically connected to the processing module, wherein the storage module includes a volatile memory unit and a non-volatile memory unit, and the non-volatile memory unit stores a file allocation table, files, and a first access permissions table, wherein each of the files has a directory entry that is unique, and file data, wherein the file allocation table organizes the non-volatile memory unit into clusters, each of the clusters corresponding to a respective one of cluster numbers, wherein the clusters include a root directory cluster and file data clusters, wherein the root directory cluster stores, for each of the files, the directory entry and a starting cluster number, which is one of the cluster numbers, wherein the file data clusters store the file data of the files, and wherein the first access permissions table includes the cluster numbers, and, for each of the cluster numbers, a data access permission code that corresponds to the cluster number;

the method further comprising steps of:

A) by the processing module, upon receipt of a read instruction associated with a target file that is one of the files stored in the non-volatile memory unit, acquiring the starting cluster number that corresponds to the target file based on the directory entry of the target file and the file allocation table, and making the starting cluster number thus acquired serve as a target cluster number;

B) by the processing module, retrieving the data access permission code that corresponds to the target cluster number from the first access permissions table, and making the data access permission code thus retrieved serve as a target data access permission code;

C) by the processing module, determining whether the target data access permission code indicates read access being permitted;

D) by the processing module, in response to the target data access permission code indicating read access being permitted, reading the file data stored in one of the file data clusters that corresponds to the target cluster number into the volatile memory unit, and determining whether the target file has been completely read based on the file data thus read;

E) by the processing module, in response to determining that the target file has not been completely read, updating the target cluster number to be one of the cluster numbers that is included in the file data being read in step D) and that indicates a next one of the file data clusters storing the file data of the target file, and repeating step B) using the target cluster number thus updated; and F) by the processing module, in response to determining that the target file has been completely read, transmitting the file data of the target file that has been stored in the volatile memory unit to the output module.

2. The method as claimed in claim 1, further comprising steps of:

G) by the processing module, in response to the target data access permission code indicating read access being denied, reading the file data stored in the one of the file data clusters that corresponds to the target cluster number into the volatile memory unit, and modifying the file data thus read into the volatile memory unit according to a predetermined rule; and H) by the processing module, transmitting the file data that is related to the target file and that has been stored into the volatile memory unit to the output module.

3. The method as claimed in claim 1, further comprising, after step F), steps of:

I) by the processing module, upon receipt of a write instruction associated with the target file, determining, based on the first access permissions table and N number of the cluster numbers that respectively correspond to N number of the file data clusters storing the file data of the target file, whether all of the data access permission codes that correspond to the N number of the cluster numbers indicate read access being permitted and write access of a same type being permitted, where N is a positive integer;

J) by the processing module, in response to all of the data access permission codes that correspond to the N number of the cluster numbers indicating read access being permitted and write access of the same type being permitted, updating the file data of the target file in the volatile memory unit based on a user input; and K) by the processing module, in response to completion of updating the file data of the target file in the volatile memory unit, replacing the file data of the target file stored in the N number of the file data clusters with the file data of the target file thus updated in the volatile memory unit.

4. The method as claimed in claim 3, further comprising a step of:

L) by the processing module, in response to all of the data access permission codes that correspond to the N number of the cluster numbers indicating read access being permitted and write access of the same type being single write access and permitted, updating the data access permission codes that are in the first access permissions table and that correspond to the N number of the cluster numbers to indicating read access being permitted and write access being denied.

5. The method as claimed in claim 1, wherein the non-volatile memory unit further stores account datasets and an account permissions table, each of the account datasets including a user account and a password corresponding to the user account, the account permissions table including the user accounts of the account datasets, and, for each of the user accounts of the account datasets, one of multiple account groups that corresponds to the user account;

wherein the method further comprises, before step A), steps of:

M) by the processing module, upon receipt a verification instruction containing a target account and a target password, verifying the target account and the target password based on the account datasets; and N) by the processing module, in response to the target account and the target password being verified successfully, which indicates that the target account is the user account of one of the account datasets, acquiring, based on the account permissions table, a target account group that is one of multiple account groups and that corresponds to the target account;

wherein step C) includes, by the processing module, determining whether the target data access permission code indicates read access being permitted for the target account group; and wherein step D) includes, by the processing module, in response to the target data access permission code indicating read access being permitted for the target account group, reading the file data stored in one of the file data clusters that corresponds to the target cluster number into the volatile memory unit, and determining whether the target file has been completely read based on the file data thus read.

6. The method as claimed in claim 1, wherein the non-volatile memory unit further stores a second access permissions table that includes storage locations of the directory entries of the files in the root directory cluster, and, for each of the storage locations, a directory access permission code corresponding to the storage location;

wherein the method comprises steps of:

O) by the processing module, upon receipt of a directory write instruction associated with the target file, acquiring a target storage location that is the storage location of the directory entry of the target file in the root directory cluster based on the directory entry of the target file and the second access permissions table;

P) by the processing module, retrieving the directory access permission code that corresponds to the target storage location from the second access permissions table, and making the directory access permission code thus retrieved serve as a target directory access permission code;

Q) by the processing module, determining whether the target directory access permission code indicates read access being permitted and write access being permitted;

R) by the processing module, in response to the target directory access permission code indicating read access being permitted and write access being permitted, updating the directory entry of the target file in the volatile memory unit based on a user input; and S) by the processing module, in response to completion of updating the directory entry of the target file in the volatile memory unit, replacing the directory entry of the target file stored in the root directory cluster with the directory entry of the target file thus updated in the volatile memory unit.

7. The method as claimed in claim 6, wherein the root directory cluster includes sectors, each of which is divided into sub-sectors, each of the directory entries is stored in one of the sub-sectors of the sectors, and each of the storage locations in the second access permissions table indicates one of the sectors where the corresponding one of the directory entries is stored, and one of the sub-sectors, where the corresponding one of the directory entries is stored, in said one of the sectors; and wherein step S) includes, by the processing module, searching the second access permissions table based on the one of the sectors and the one of the sub-sectors as indicated by the target storage location, thereby retrieving the directory access permission code that corresponds to the target storage location.

8. The method as claimed in claim 6, wherein the non-volatile memory unit further stores a second access permissions table that includes storage locations of the directory entries of the files in the root directory cluster, and, for each of the storage locations, a directory access permission code corresponding to the storage location;

wherein the method further comprises a step of:

T) by the processing module, in response to the target directory access permission code indicating read access being permitted and write access being single write access and permitted, updating the directory access permission code that is in the second access permissions table and that corresponds to the target storage location to indicate read access being permitted and write access being denied.

* * * * *